United States Patent
Du et al.

(10) Patent No.: US 11,941,880 B2
(45) Date of Patent: Mar. 26, 2024

(54) SYSTEM AND METHOD FOR IMAGE-BASED CROP IDENTIFICATION

(71) Applicant: PING AN TECHNOLOGY (SHENZHEN) CO., LTD., Shenzhen (CN)

(72) Inventors: Chen Du, Sunnyvale, CA (US); Jui-Hsin Lai, Santa Clara, CA (US); Mei Han, Palo Alto, CA (US)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 386 days.

(21) Appl. No.: 17/337,410

(22) Filed: Jun. 2, 2021

(65) Prior Publication Data
US 2022/0391614 A1 Dec. 8, 2022

(51) Int. Cl.
*G06V 20/10* (2022.01)
*G06F 16/58* (2019.01)
*G06F 18/214* (2023.01)
*G06F 18/2413* (2023.01)
*G06F 18/40* (2023.01)
*G06N 20/00* (2019.01)
*G06V 20/68* (2022.01)

(52) U.S. Cl.
CPC ........ *G06V 20/188* (2022.01); *G06F 16/5866* (2019.01); *G06F 18/214* (2023.01); *G06F 18/2413* (2023.01); *G06F 18/40* (2023.01); *G06N 20/00* (2019.01); *G06V 20/68* (2022.01)

(58) Field of Classification Search
CPC .... G06V 10/774; G06V 10/82; G06V 20/188; G06V 20/68; G06F 16/55; G06F 16/5866; G06F 18/214; G06F 18/2413; G06F 18/40; G06N 3/09; G06N 20/00
See application file for complete search history.

(56) References Cited

U.S. PATENT DOCUMENTS

| | | | |
|---|---|---|---|
| 10,182,214 B2 * | 1/2019 | Gornik | H04N 7/185 |
| 10,234,439 B2 * | 3/2019 | Sutton | G06T 7/0016 |
| 10,318,810 B2 * | 6/2019 | Ritter | G06F 18/213 |
| 2016/0239709 A1 * | 8/2016 | Shriver | G06V 20/188 |
| 2016/0253595 A1 * | 9/2016 | Mathur | G06F 30/00 706/12 |
| 2016/0334276 A1 * | 11/2016 | Pluvinage | B64C 39/024 |
| 2017/0041407 A1 * | 2/2017 | Wilbur | G06Q 50/02 |
| 2019/0228224 A1 * | 7/2019 | Guo | G06N 20/20 |
| 2020/0012853 A1 * | 1/2020 | Freitag | G06V 10/774 |

(Continued)

*Primary Examiner* — Nay A Maung
*Assistant Examiner* — Jose M Torres
(74) *Attorney, Agent, or Firm* — BAYES PLLC (57) ABSTRACT

A system and a method for image-based crop identification are disclosed. The image-based crop identification system includes a database, a communication module and a model library. The database stores sample aerial data and annotated aerial data. The communication module is coupled to the database, and is configured to provide the sample aerial data to a user and receive the annotated aerial data from the user. The model library is coupled to the database, and is configured to obtain the annotated aerial data, train a crop classification model based on the annotated aerial data, and provide the trained crop classification model for subsequent crop identification. The annotated aerial data include determination of the type of the crop appearing in the sample aerial data.

20 Claims, 6 Drawing Sheets

(56) References Cited

U.S. PATENT DOCUMENTS

| | | | |
|---|---|---|---|
| 2021/0012109 A1* | 1/2021 | Chou | G06V 10/752 |
| 2021/0142559 A1* | 5/2021 | Yousefhussien | G06T 7/11 |
| 2021/0319059 A1* | 10/2021 | Vianello | G06N 3/04 |
| 2022/0383050 A1* | 12/2022 | Brau | G06N 3/084 |

* cited by examiner

SYSTEM AND METHOD FOR IMAGE-BASED CROP IDENTIFICATION

TECHNICAL FIELD

The present disclosure relates to an image-based identification system and a method for identifying objects in an aerial data, and more particularly, to an image-based crop identification system and a method for identifying a type of a crop in an aerial data.

BACKGROUND

Those who are engaged in planning, making policies, and making various items relating to city zoning, landscaping, agricultural management, or land use often resort to a representation that utilizes a large land, such as an aerial image showing selected land-related features. For example, precision agricultural management emerges as a new way of managing farming of agricultural products through various decision support systems (DSS). Precision agricultural management may use images captured of farmland or other large agricultural regions to process the information contained therein. However, obtaining and analyzing such images are often expensive, complex, and subject to various limitations.

For example, conventional analysis requires a large amount of human labeling for agricultural management, and thus unsuitable for large-range feature identification due to differences among distinct regions. In addition, identifying features in each individual image is also a difficult task that increases the difficulty of establishing a reusable DSS and requires significantly more manpower.

Embodiments of the disclosure address the above problems by providing an intellectually sampling method that uses aerial data to identify crops therein with an agricultural management model that has an enhanced training speed and provides flexibility to be rapidly renewed.

SUMMARY

Embodiments of the image-based crop identification system and the method for identifying a type of a crop in an aerial image are disclosed herein.

In one aspect, an image-based crop identification system is disclosed. The image-based crop identification system includes a database, a communication module and a model library. The database stores sample aerial data and annotated aerial data. The communication module is coupled to the database, and is configured to provide the sample aerial data to a user and receive the annotated aerial data from the user. The model library is coupled to the database, and is configured to obtain the annotated aerial data, train a crop classification model based on the annotated aerial data, and provide the trained crop classification model for subsequent crop identification. The annotated aerial data include determination of the type of the crop appearing in the sample aerial data.

In another aspect, a method for identifying a type of a crop in aerial data is disclosed. The sample aerial data are obtained. The sample aerial data are stored in a database. The sample aerial data are provided for annotation according to an ordering rule. A type of a crop appearing in the sample aerial data is determined to obtain annotated aerial data. The annotated aerial data are returned to the database. A crop classification model is trained based on at least the annotated aerial data. The trained crop classification model is applied to subsequent crop identification.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated herein and form a part of the specification, illustrate implementations of the present disclosure and, together with the description, further serve to explain the present disclosure and to enable a person skilled in the pertinent art to make and use the present disclosure.

Implementations of the present disclosure will be described with reference to the accompanying drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Those who are engaged in planning, making policies, and making various items relating to various applications of land use often resort to a representation that utilizes a large land, such as aerial data showing selected land-related features, for example, city zoning, forest distribution, or agricultural management. The types of information conveyed by the aerial data include geographic features, such as land boundaries, crops, forestry, objects, and artificial features, such as highways, bridges, and buildings. The aerial data may be aerial images captured from a manned or unmanned aerial vehicle (e.g., UAV, aircraft, hot balloon, etc.), or data from a satellite, including aerial images, satellite data, satellite images, near-infrared data or radio wave data. For example, satellite and aircraft survey may generate many photographic images that provide details not readily available in other ways. Such aerial images may also illustrate land pacts from above in a scale unparalleled by images taken on the ground. The aerial images and related data are sent to a ground station or central processing station, modified to suit the needs of the end user, and the processed results may be utilized again.

In recent years, the need for crop identification and crop growth detection has become an important issue for agricultural management. By utilizing the aerial images, there are advantages such as fast feedback period, wide coverage range, low acquisition cost and the like. In addition, machine learning or neural network systems may also be utilized for crop identification and crop growth detection. Hence, the present disclosure uses the agricultural management and crop identification as an example to explain the detail operations. It is understood that the application of the crop identification systems and methods is for illustration purpose only, and not intended to limit the application in any way. Furthermore, the aerial data in the present disclosure may include aerial images, satellite data, satellite images, near-infrared data, radio wave data, or other suitable images or data. The example using the aerial image is for illustration purpose only, and not intended to limit the types of aerial data in any way.

Figure 1:
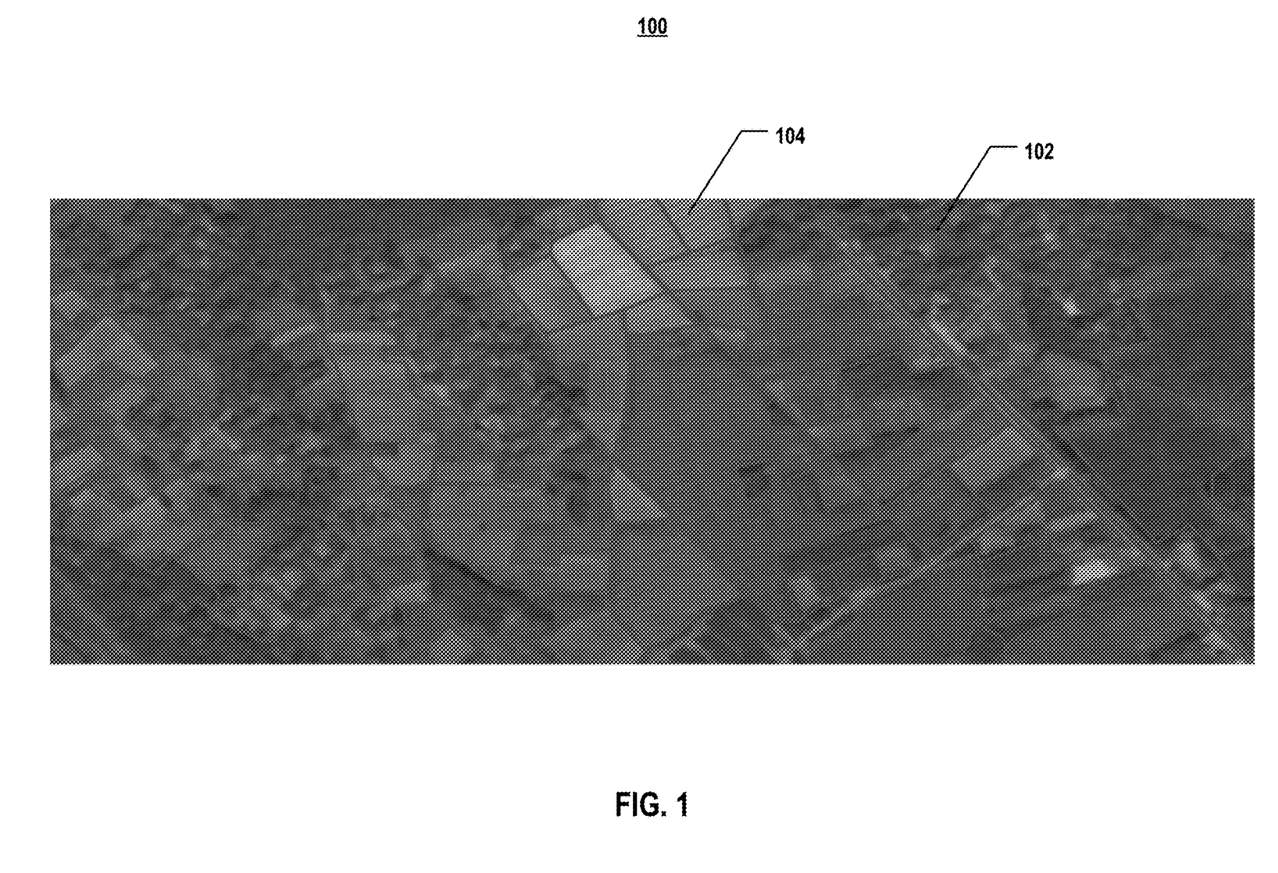
FIG. 1 illustrates an exemplary aerial image, according to embodiments of the disclosure.

FIG. 1 illustrates an exemplary aerial image 100, according to embodiments of the disclosure. The aerial image 100 may be taken during the summer, and as a result all of the crops are visible as the green regions. However, the green regions may have different color depths or gray level depths, representing different types of land use. For example, the region 102 may represent forest and the region 104 may represent wheat crop. Other types of crop may include rice, sugarcane, maize, potato, or other types of crop that may constitute staple food of people living in the region.

Consistent with the present disclosure, the types of land use may be classified by a crop identification system using one or more aerial images taken of the land. The types of land use may include wheat, rice, sugarcane, maize, potato, or other types of crops that may constitute staple food for people living on the land. When a Convolutional Neural Network (CNN) classification network is used for classification, a large amount of land region annotation data is required to train the network model. The land region annotation data may include land boundary and crop type. Because the same color depth, or gray level depth, in different terrains, latitudes, or months of growth, may represent different crops, these annotation jobs require a certain amount of manpower from persons with relevant agricultural knowledge to identify the crop type by viewing the images.

By annotating a well-trained model, it is often possible to correctly predict the type of crop in an image in which the data is located, but the crop growth or crop species in different regions also tends to differ due to latitude, altitude, geographic terrain, and the like of different regions. The same model may not work well in terms of result prediction when being applied to another region. In addition, because the resolution of the aerial images is not high (e.g., a resolution of merely 10 meters on the ground), the aerial image may have only a few pixels for a small parcel of land containing a specific crop type, it is difficult to see details or crop characteristics in that parcel clearly.

The present disclosure provides an image-based crop identification system and method that can update the training model, generate an intelligent sampling mode by using the annotated images, and apply to a new project of crop identification. The image-based crop identification system utilizes active learning and interactive design, and can train a good crop classification model with low cost and can be applied to different areas. It is understood that the present disclosure may be extended to scenarios where the object being identified is something other than the crop, such as forestry, land boundaries, etc.

Figure 2:
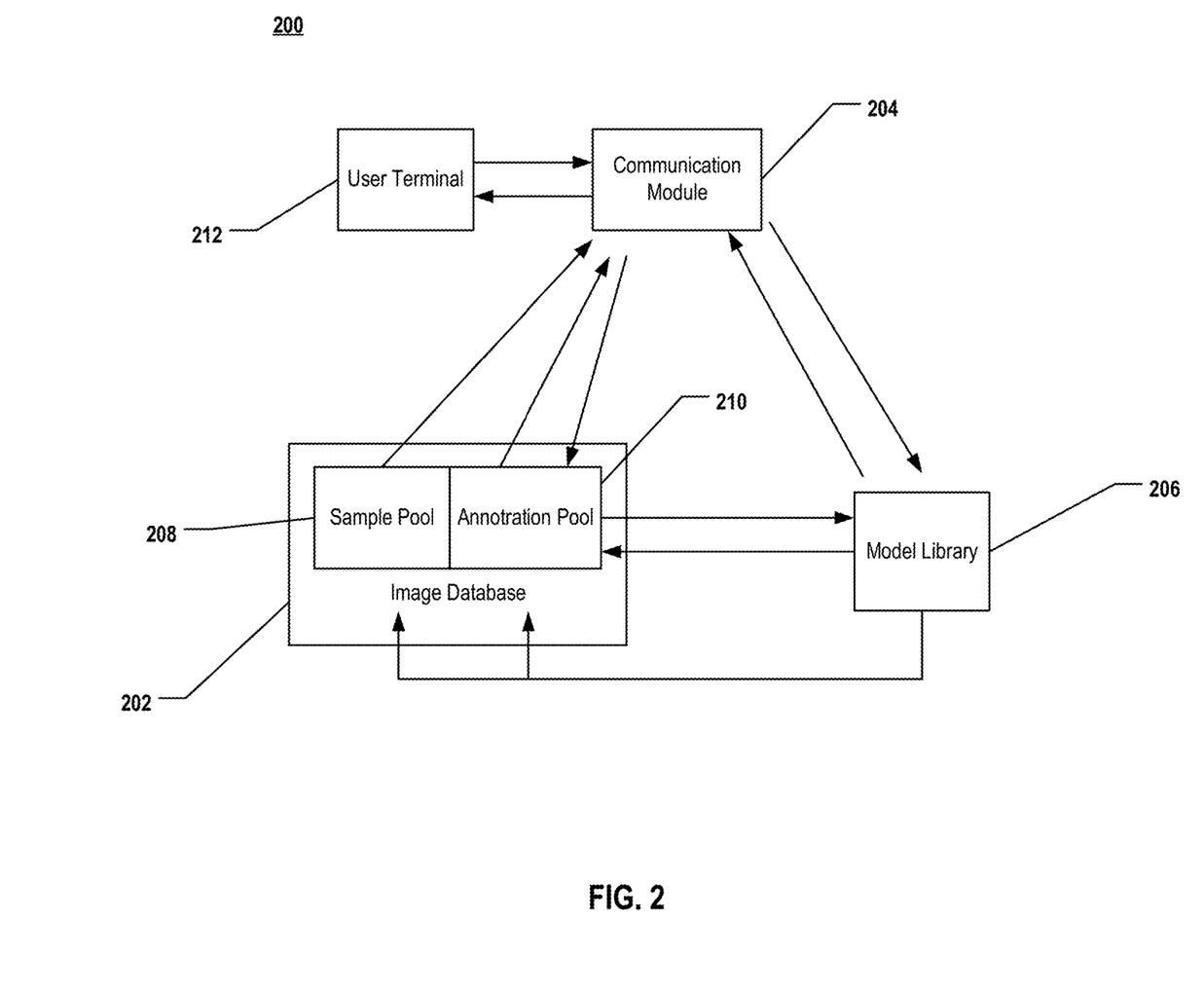
FIG. 2 illustrates an exemplary image-based crop identification system, according to embodiments of the disclosure.

FIG. 2 illustrates an exemplary image-based crop identification system 200, according to embodiments of the disclosure. Image-based crop identification system 200 includes an image database 202, a communication module 204 and a model library 206. Image database 202 includes a sample pool 208 storing the sample images not being annotated and an annotation pool 210 storing the annotated images. It is noted that in other applications where aerial data other than aerial images are used, such as satellite data, near-infrared data, or radio wave data, the present disclosure may employ a database different from image database 202 that performs the same or substantially similar functionalities on these aerial data as image database 202 on the aerial images. It is also noted that the object being identified according to the present disclosure may be something other than the crop, such as forestry, land boundaries, etc., according to certain embodiments.

In some embodiments, the sample images not being annotated may be aerial images captured by satellites or by manned or unmanned aerial vehicles (e.g., UAV, aircraft, hot balloon, etc.). The sample images may be obtained from one or multiple sources. For example, the sample images may be obtained from a satellite. For another example, the sample images may be obtained from two or more satellites. For a further example, the sample images may be obtained from a satellite and an aerial vehicle. According to the embodiments, the sample images taken of the same ground area, regardless of their respective sources, may be grouped together for model training and/or crop identification.

Communication module 204 may be coupled to image database 202 and configured to communicate with image database 202 to receive or transmit images. Communication module 204 may receive the sample images from image database 202 and provide the sample images to a user for annotation. Communication module 204 may further receive the annotated images from the user and transmit the annotated images to image database 202. The annotated images may be stored in annotation pool 210. The annotated images may include determination of the type of a crop appearing in the sample images. In some embodiments, the determination may be made by a user upon looking at the images based on his/her experience. In other embodiments, such annotation may be done by using the trained model for crop identification. For example, when an image is input into the well trained model, the type of the crop may be quickly identified and output by the model.

In some embodiments, a user terminal 212 may be further coupled to communication module 204. User terminal 212 may include a display showing the sample images to the user and an input interface for the user to input annotation instructions. In some embodiments, the user may utilize user terminal 212 to annotate the sample images, perform model training and crop prediction, or obtain model parameters. Model library 206 may be coupled to communication module 204 and also capable of interacting with image database 202. The user may select a required model type from model library 206 through user terminal 212 and communication module 204. In some embodiments, the model training is carried out by using the annotated images stored in annotation pool 210, and the sample images in sample pool 208 may be further evaluated by using the current model to effectively generate a to-be-annotated ordering rule. Then, the sample images may be provided to communication module 204 and user terminal 212 based on the ordering rule.

Figure 3:
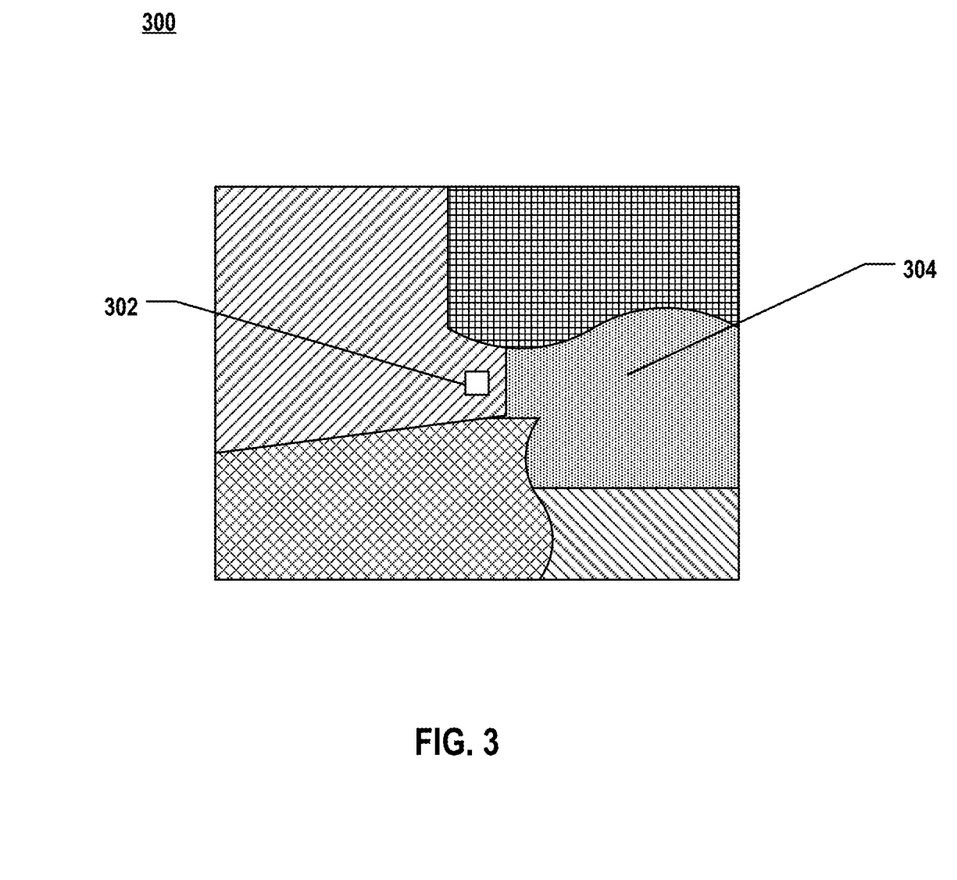
FIG. 3 illustrates an exemplary land region annotation of a sample image, according to embodiments of the disclosure.

FIG. 3 illustrates an exemplary land region annotation of a sample image 300, according to embodiments of the disclosure. Image database 202 includes sample pool 208 storing the sample images and annotation pool 210 storing the annotated images. Sample image 300 may include a center parcel 302 and a background region 304. Since crop identification may require information relating to time and space, we do not need to annotate the entire area when considering that the characteristics of the same crop in a region are consistent, that is, the physical information has been substantially the same. In the present disclosure, only a small number of samples per area are required to be correctly labeled, and the target crop and other background features could be separated. For example, the user may annotate sample image 300 by labeling the target crop located in center parcel 302. Hence, the user does not need to label other features located in the entire background region 304 and the process time and cost can therefore be significantly reduced.

In some embodiments, sample image 300 may be displayed on user terminal 212 along with center parcel 302, and the user may label sample image 300 through a user interface with a crop classification of the area represented by center parcel 302. Then, communication module 204 may receive the annotated image from user terminal 212 and provide the annotated image to image database 202 to store the annotated image in annotation pool 210.

In some embodiments, sample image 300 may further include the time stamp and/or the coordinate information indicative of the geodetic location of a parcel of land contained in the image for the reference of annotation. For example, sample image 300 may include the longitude, latitude and/or altitude indicating where the parcel in sample image 300 is located, or the date, time or season of the shooting of sample image 300. In some embodiments, sample image 300 may further include equipment information used to obtain the aerial images. For example, provided sample image 300 is captured by a satellite, sample image 300 may include information describing the satellite type, channel value, whether visible light is detected and/or whether invisible light is detected. This may further enhance the precision of managing the agricultural features of the land taken in the images.

Figure 4:
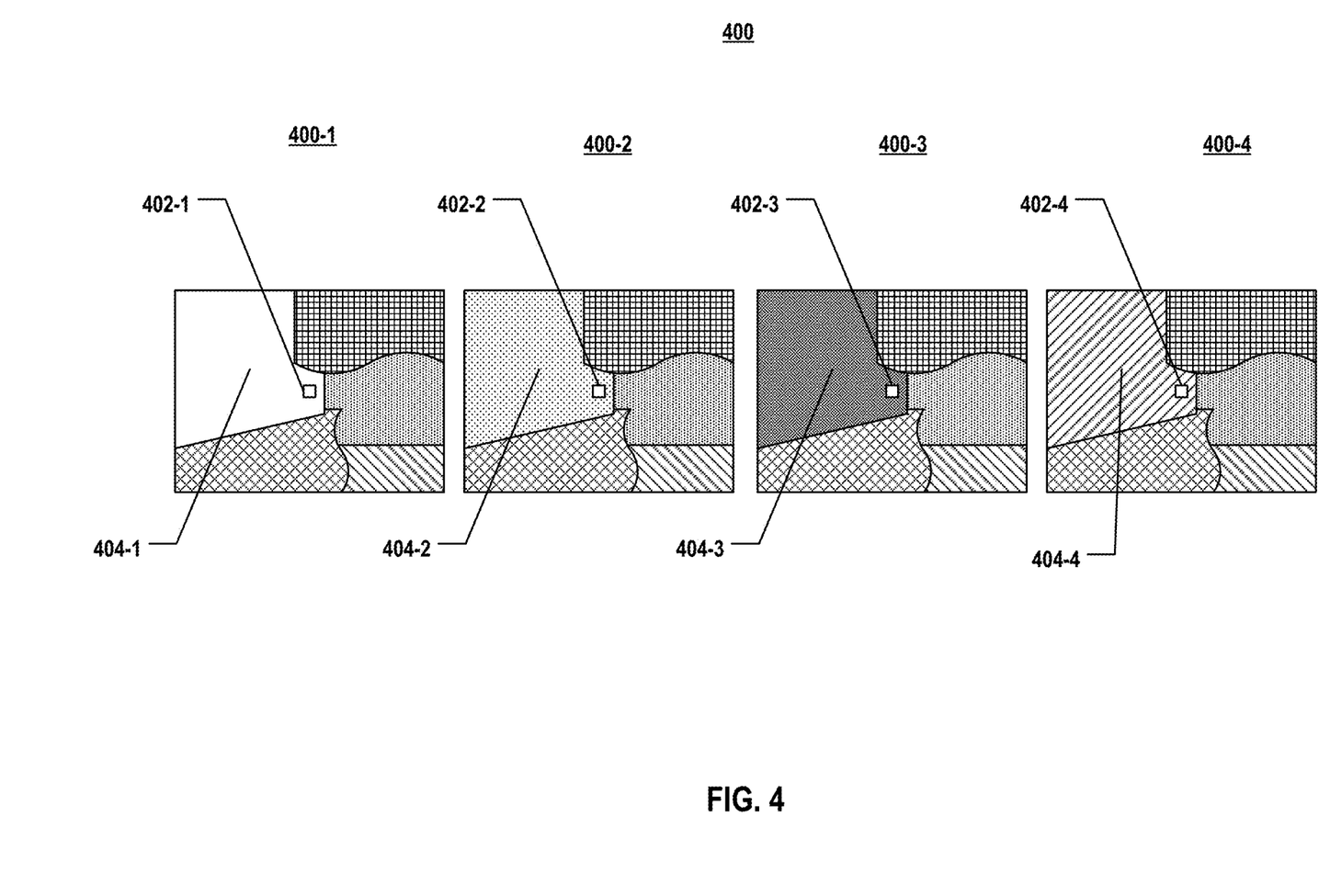
FIG. 4 illustrates a series of exemplary sample images obtained at different times, according to embodiments of the disclosure.

FIG. 4 illustrates a series of exemplary sample images 400 obtained at different times, according to embodiments of the disclosure. In some embodiments, communication module 204 may provide a series of sample images 400, including sample images 400-1, 400-2, 400-3 and 400-4, to user terminal 212, and user terminal 212 may display these sample images 400-1, 400-2, 400-3 and 400-4 together for annotation. Sample images 400-1, 400-2, 400-3 and 400-4 are the aerial images captured for a same target region at different times. For example, sample image 400-1 may be obtained in January, sample image 400-2 may be obtained in April, sample image 400-3 may be obtained in July, and sample image 400-4 may be obtained in October. It is understood that the time, the shape of the land region, and the crop situation shown in FIG. 4 are for illustration purpose only and the embodiments consistent with the present disclosure are not limited thereto. It is also understood that the number of images displayed together by user terminal 212 may be adjusted according to actual requirement and thus not limited.

As shown in FIG. 4, the pattern types of the land region 404 are different among sample images 400-1, 400-2, 400-3 and 400-4, and the difference represents that the crop situation in land regions 404-1, 404-2, 404-3 and 404-4 is noticeable. For example, land region 404-1 may represent uncultivated land, land region 404-2 may represent plant growth, land region 404-3 may represent thick plant, and land region 404-4 may represent harvested land. Since the series of sample images 404-1, 404-2, 404-3 and 404-4 are obtained for a same target region at different times and each crop has a unique growth characteristic in terms of different seasons, the crop situation at different times plays an important role when annotating the sample image 400. Based on the information, including the crop situation at different times and the geodetic location, user terminal 212 may judge the crop type and have sample image 400 annotated with a specific crop label, and the annotated image may be stored in annotation pool 210 in image database 202.

In some embodiments, the crop situation may be represented by the color depth or the gray level depth. In some embodiments, the crop situation may be obtained from visible light photography, infrared photography or invisible light photography.

In some embodiments, the annotated images stored in annotation pool 210 may be re-annotated by user terminal 212 according to requirement of actual application and may be stored in annotation pool 210 of image database 202 after re-annotation. In some embodiments, the sample images and the annotated images may be provided to communication module 204 based on an ordering rule. User terminal 212 may annotate the sample images or re-annotate the annotated images based on the order of images provided to communication module 204 and user terminal 212.

In some embodiments, the ordering rule may include a number indicative of annotation times of each sample image or annotated image, a first value indicative of a first uncertainty degree of each sample image or annotated image, and a second value indicative of a second uncertainty degree of the crop classification model. In some embodiments, provided the number indicative of annotation times of the ith sample image or annotated image is $n_i$, the first value indicative of the first uncertainty degree of the ith sample image or annotated image is $\alpha_i$, and the second value indicative of the second uncertainty degree of the crop classification model for the ith sample image is $\beta_i$, the priority v in the ordering rule may be represented by:

$$v = \frac{k}{n_i} + l*a_i + m*\beta_i, \qquad (E1)$$

wherein i=1, 2, . . . , n, while k, l and m are weighting coefficients. The weighting coefficients may be adjusted according to the training result of the model so that applying the ordering rule to the sample images may generate accurate identification of the crop in the images.

Based on equation E1, in some embodiments, the sample image or the annotated image with few annotation times, high first uncertainty degree, or high second uncertainty degree has a high priority in the ordering rule. In one implementation of the ordering rule, when two images are chosen for subsequent annotation, the ordering rule may determine which image is first presented for annotation. For example, the image with fewer annotation times than the other image while having the same first and second uncertainty degrees may be presented first for annotation, which may occur at user terminal 212. Alternatively, when the two images with the same annotation times and second uncertainty degree are distinguished by the first uncertainty degree, the one with the higher first uncertainty degree may be presented first for annotation. In embodiments where more than one parameter in the priority equation E1 differs between the two images, the image with a larger v value may be presented first for annotation.

In some embodiments, the first value indicative of the first uncertainty degree of each sample image or annotated image and the second value indicative of the second uncertainty degree of the crop classification model may be determined using one or more known methods in the machine learning field, including information entropy-based uncertainty analysis, least confident-based uncertainty sampling, margin sampling for active learning, etc.

Model library 206 may be used to generate and save the crop classification models. In addition, user terminal 212 may invoke model library 206 through communication module 204 to predict the crop classification in selected areas. Model library 206 may be coupled to communication module 204 and also capable of interacting with image database 202. The user may select a required model type from model library 206 through user terminal 212 and communication module 204. In some embodiments, the model training is carried out by using the annotated images stored in annotation pool 210, and the sample images in sample pool 208 may be further evaluated by using the current model to effectively generate a to-be-annotated ordering rule.

The crop classification models according to the present disclosure may include a discrete data prediction model or a sequential data prediction model.

The discrete data prediction model may disorganize the data and send all the data to the model for training, that is, there is no time or space correlation between the data. The model is discrete for the prediction of the data, and when only one data point at a certain moment is provided, the model can also give a crop classification prediction. However, prediction of a single time tends to be unreliable. For example, the crops in a green leaf period and bushes in the same period may have an extremely high degree of similarity on the data. Therefore, when using the discrete data prediction model, the crop prediction needs to be performed at different time points targeting the same area. Further, the weighting coefficients may also be added to obtain the classification model with better prediction results. In some embodiments, the discrete data prediction model may employ one or more of the following deep learning algorithms: fully connected neural network, Gaussian process, or support-vector machines (SVM).

The sequential data prediction model may arrange data of the same location as a sequence based on the time of capturing and use the sequence as an input to the model. In some embodiments, the sequential data prediction model may employ a recurrent neural network (RNN) architecture based on a long short-term memory (LSTM) neural network model.

Furthermore, the crop classification models according to the present disclosure may also include a parcel identification model. The parcel identification model may divide a whole land region into a plurality of parcels and perform crop identification in each parcel. The identification results in each parcel are counted and the whole land region is classified to a crop type that has statistically the most appearing result. This will yield better classification results for large images, particularly for those with higher pixel granularity. In some embodiments, the parcel identification model may include a semantic segmentation model based on Deeplab. In some embodiments, the parcel identification model may include an instance segmentation model based on Mask Region Based Convolution Neural Network (Mask R-CNN).

Figure 5:
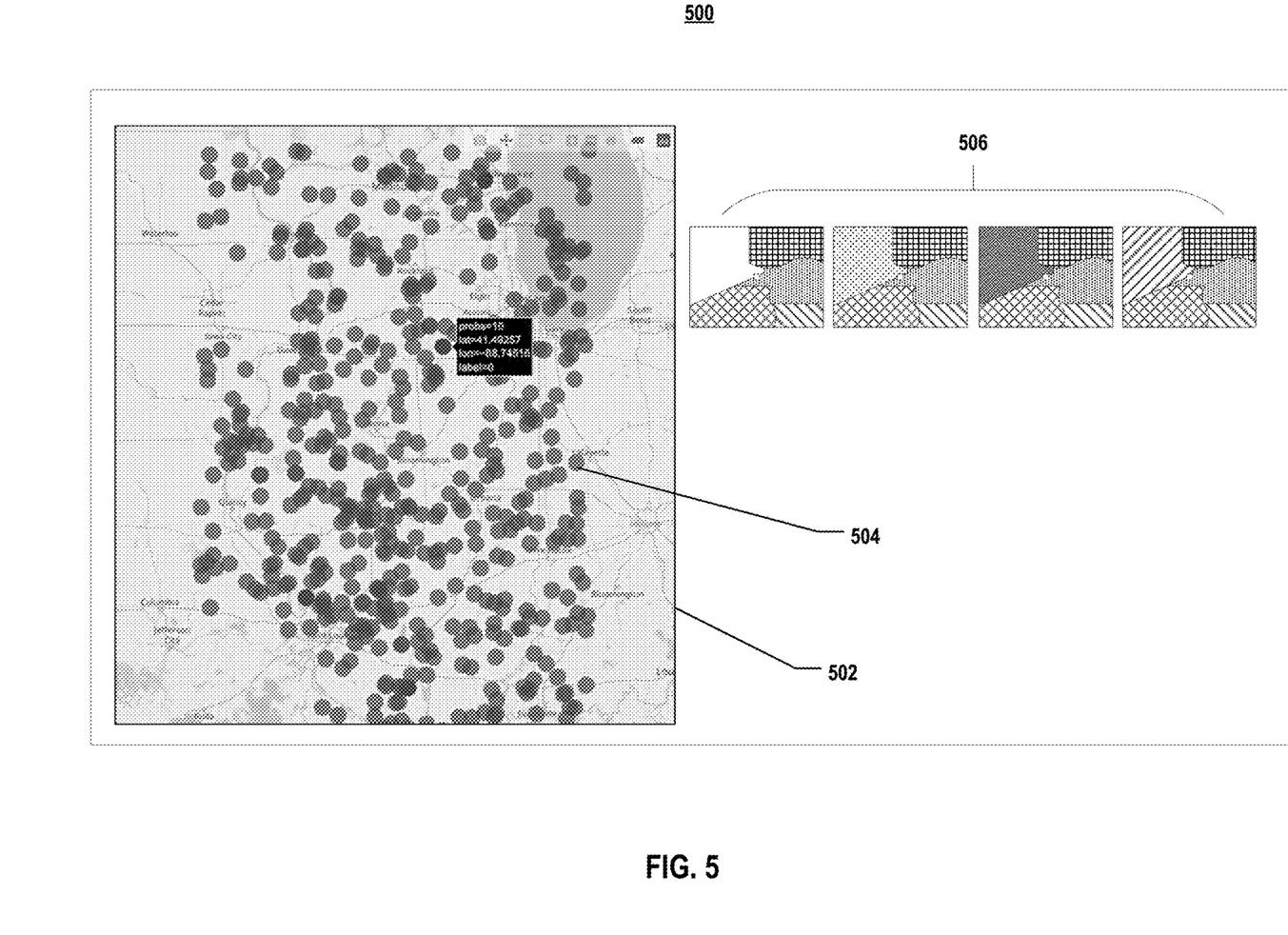
FIG. 5 illustrates an exemplary user interface, according to embodiments of the disclosure.

FIG. 5 illustrates an exemplary user interface 500, according to embodiments of the disclosure. User interface 500 may be shown on user terminal 212 to display the sample images to the user and for the user to input annotation instructions. User interface 500 may include a map 502 having a plurality of to-be-annotated locations labeled on map 502. In some embodiments, when the user chooses one to-be-annotated location 504, a series of sample images 506 related to location 504 may be shown on the user interface. The crop identification system according to the present disclosure may have some default crop species stored, which may be displayed onto user terminal 212, and may also have the flexibility to build customized crop lists.

The user may annotate the sample images presented in a sequence according to the ordering rule. In some embodiments, the user may choose a specific area or a specific timeframe to perform the annotation of one or more images through user interface 500. In some embodiments, the geodetic location, including the longitude, latitude and/or altitude, or the date and time of the acquisition of sample image may be provided to the user through user interface 500. The geodetic location may help the user determine the type of crop appearing in the image because the same type of crop may harvest in different seasons if planted at different geodetic locations. For example, wheat may harvest in northeast China in July while in central China in June, thus having different growth features in these two regions as reflected by the color depths and/or gray level depths of the images.

In some embodiments, the user may request data annotating via user terminal 212 and communication module 204 to image database 202, and user terminal 212 and communication module 204 may receive unannotated sample images or to-be-reannotated annotated images from image database 202 according to the ordering rule. User terminal 212 may present the images and related information to the user through a user interface. In some embodiments, after the user has annotated the images, the annotated images may be transferred to image database 202 for storing or transferred to model library 206 for model training. The trained model may be then compared to images in annotation pool 210 or be transferred to communication module 204 for user's inspection or subsequent application to newly acquired images that are the subject of new crop identification.

User terminal 212 may provide a high degree of flexibility to the user, and the user may choose to annotate the sample images at different coordinates or select the sample images at different time points of the same coordinate information for annotating. Furthermore, the user may also self-build any label that may be used for the annotation.

By annotating the center parcel 302 in FIG. 3 or center parcel 402 in FIG. 4, the annotation operation using the machine learning or the neural network systems may be largely improved. Because the training model and the intelligent sampling mode are updated with small amount of information and manpower, the cost can be reduced, and the efficiency can also be improved. Further, the image-based crop identification system utilizes active learning and interactive design, and the flexibility of the user experience can be obtained together with a good crop classification model with low cost and can be applied to different areas.

Figure 6:
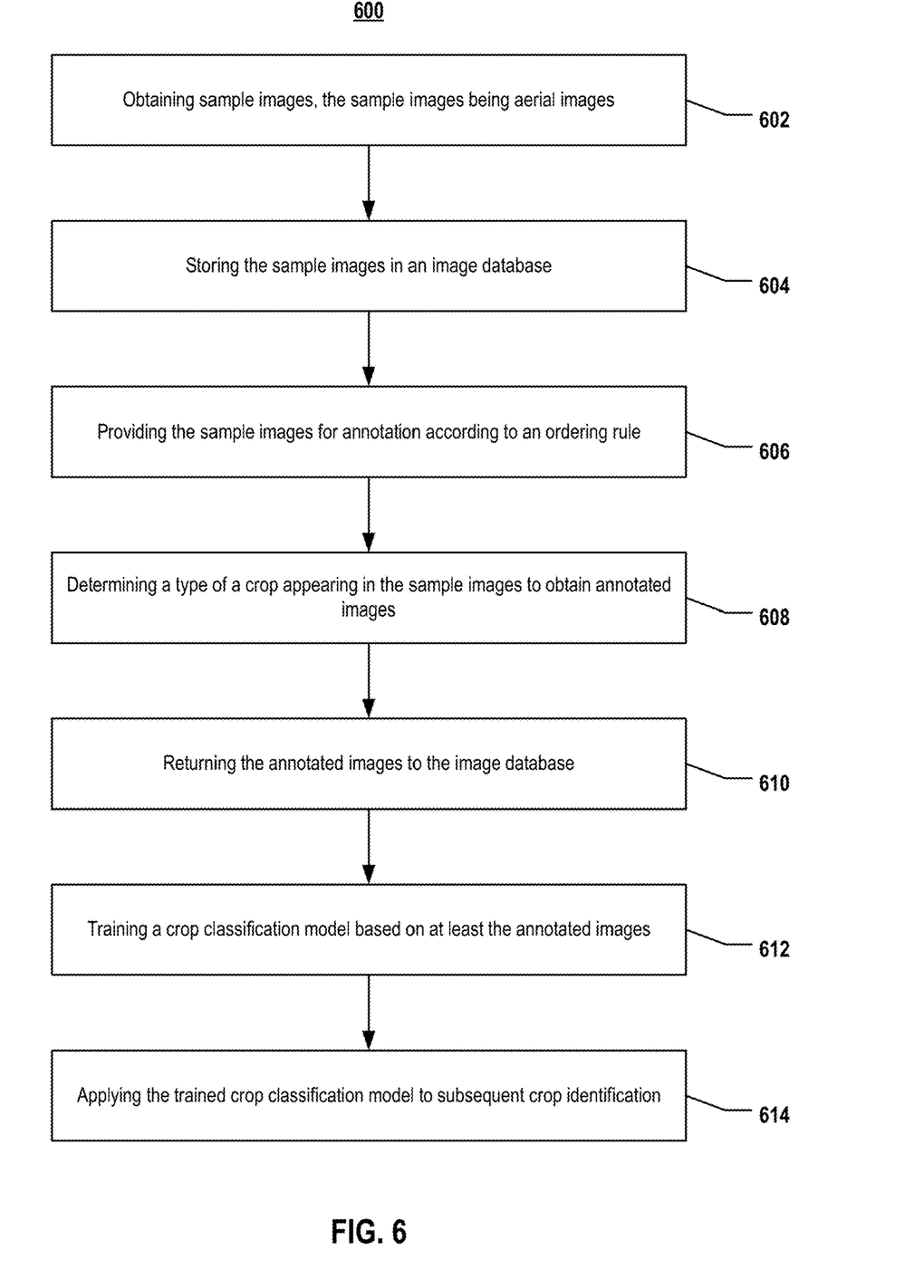
FIG. 6 is a flowchart of an exemplary method for identifying a type of a crop or an object in an aerial image or aerial data, according to embodiments of the disclosure.

FIG. 6 is a flowchart of an exemplary method 600 for identifying a type of a crop or an object, in an aerial image or aerial data, according to embodiments of the disclosure. In operation 602, the sample images may be obtained. The sample images may include aerial images. In some embodiments, the sample images may include aerial images captured by satellites or by manned or unmanned aerial vehicles (e.g., UAV, aircraft, hot balloon, etc.). The sample images may be obtained from one or multiple sources. For example, the sample images may be obtained from a satellite. For another example, the sample images may be obtained from two or more satellites. For a further example, the sample images may be obtained from a satellite and an aerial vehicle. According to the embodiments, the sample images taken of the same ground area, regardless of their respective sources, may be grouped together for model training and/or crop identification.

In operation 604, the sample images may be stored in an image database. In some embodiments, the image database may include a sample pool for storing the sample images not being annotated and an annotation pool for storing the annotated images. In some embodiments, at least one of the sample images may include the coordinate information indicative of the geodetic location of a parcel of land contained in the image for the reference of annotation. In some embodiments, the coordinate information of the at least one sample image further include one or more of longitude, latitude, and/or altitude indicating where the parcel in the sample image is located, or the date, time or season of the shooting of the sample image. In some embodiments, the sample image may further include equipment information used to obtain the aerial images.

In operation 606, the sample images are provided for annotation according to an ordering rule. In some embodiments, a single sample image may be provided for annotation. In some embodiments, a series of sample images may be provided for annotation, and the series of sample images may include information representing a same area at different times. In some embodiments, the ordering rule is defined based on a number indicative of annotation times of each sample image, a first value indicative of a first uncertainty degree of each sample image, and a second value indicative of a second uncertainty degree of the crop classification model.

In some embodiments, provided the number indicative of annotation times of the ith sample image or annotated image is $n_i$, the first value indicative of the first uncertainty degree of the ith sample image or annotated image is $\alpha_i$, and the second value indicative of the second uncertainty degree of the crop classification model for the ith sample image is $\beta_i$, the priority v in the ordering rule may be represented by:

$$v = \frac{k}{n_i} + l*a_i + m*\beta_i, \quad (E1)$$

wherein i=1, 2, . . . , n, while k, l and m are weighting coefficients. The weighting coefficients may be adjusted according to the training result of the model so that applying the ordering rule to the sample images may generate accurate identification of the crop in the images.

Based on equation E1, in some embodiments, the sample image or the annotated image with few annotation times, high first uncertainty degree, or high second uncertainty degree has a high priority in the ordering rule. In one implementation of the ordering rule, when two images are chosen for subsequent annotation, the ordering rule may determine which image is first presented for annotation. For example, the image with fewer annotation times than the other image while having the same first and second uncertainty degrees may be presented first for annotation, which may occur at the user terminal. Alternatively, when the two images with the same annotation times and second uncertainty degree are distinguished by the first uncertainty degree, the one with the higher first uncertainty degree may be presented first for annotation. In embodiments where more than one parameter in the priority equation E1 differs between the two images, the image with a larger v value may be presented first for annotation.

In operation 608, a type of a crop appearing in the sample images is determined to obtain annotated images. The sample images may be displayed on the user terminal, and each of the sample images has a center parcel. A crop classification of an area represented by the center parcel is associated with the sample images to generate the annotated images. Since crop identification may require information relating to time and space, we do not need to annotate the entire area when considering that the characteristics of the same crop in a region are consistent, that is, the physical information has been substantially the same. In the present disclosure, only a small number of samples per area are required to be correctly labeled, and the target crop and other background features could be separated. For example, the user may annotate the sample image by labeling the target crop located in the center parcel. Hence, the user does not need to label or annotate other features located in the entire background region and the process time and cost can therefore be significantly reduced.

In operation 610, the annotated images are returned to the image database. In some embodiments, the annotated images stored in the annotation pool may be re-annotated by a user terminal according to requirement of actual application and may be stored in the annotation pool of the image database after re-annotation.

In operation 612, a crop classification model is trained based on at least the annotated images. In some embodiments, a discrete data prediction model or a sequential data prediction model is provided to generate the crop classification model. In some embodiments, the discrete data prediction model may employ one of more of the following deep learning algorithms: fully connected neural network, Gaussian process, or support-vector machines (SVM). In some embodiments, the sequential data prediction model may employ a recurrent neural network (RNN) architecture based on a long short-term memory (LSTM) neural network model.

Furthermore, the crop classification models according to the present disclosure may also include a parcel identification model. The parcel identification model may divide a whole land region into a plurality of parcels and perform crop identification in each parcel. The identification results in each parcel are counted and the whole land region is classified to a crop type that has statistically the most appearing result. This will yield better classification results for large images, particularly for those with higher pixel granularity. In some embodiments, the parcel identification model may include a semantic segmentation model based on Deeplab. In some embodiments, the parcel identification model may include an instance segmentation model based on Mask Region Based Convolution Neural Network (Mask R-CNN).

In operation 614, the trained crop classification model is applied to subsequent crop identification. In some embodiments, at least the annotated images are provided to a model library to generate the crop classification model. The crop classification model may be returned to the image database and the ordering rule may be updated based on the crop classification model.

By annotating the center parcel, the annotation operation using the machine learning or the neural network systems may be largely improved. Because the training model and the intelligent sampling mode are updated with small amount of information and manpower, the cost can be reduced, and the efficiency can also be improved. Further, the image-based crop identification system utilizes active learning and interactive design, and the flexibility of the user experience can be obtained together with a good crop classification model with low cost and can be applied to different areas.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

According to one aspect of the present disclosure, an image-based crop identification system is disclosed. The image-based crop identification system includes a database, a communication module and a model library. The image database stores sample aerial data and annotated aerial data. The communication module is coupled to the database, and the communication module is configured to provide the sample aerial data to a user and receive the annotated aerial data from the user. The model library is coupled to the database, and the model library is configured to obtain the annotated aerial data, train a crop classification model based on the annotated aerial data, and provide the trained crop classification model for subsequent crop identification. The annotated aerial data include determination of the type of the crop appearing in the sample aerial data.

In some embodiments, the sample aerial data include one or more of sample aerial images, sample satellite data, sample satellite images, sample near-infrared data or sample radio wave data, and the annotated aerial data include one or more of annotated aerial images, annotated satellite data, annotated satellite images, annotated near-infrared data or annotated radio wave data.

In some embodiments, a user terminal is coupled to the communication module, and the user terminal includes a display and an input interface. The display shows the sample aerial data to the user and the input interface receives one or more annotation instructions from the user. In some embodiments, the sample aerial data are provided to the communication module based on an ordering rule including a number indicative of annotation times of each piece of sample aerial data, a first value indicative of a first uncertainty degree of each piece of sample aerial data, and a second value indicative of a second uncertainty degree of the crop classification model.

In some embodiments, the communication module receives a plurality of sample aerial data representing a same area at different times, and the plurality of sample aerial data are annotated with a crop classification to determine the type of the crop appearing in the sample aerial data at each time. In some embodiments, the annotated aerial data are further provided from the communication module, re-annotated at the user terminal, and stored to the database after re-annotation.

In some embodiments, at least one piece of the sample aerial data includes coordinate information indicative of the geodetic location of a parcel of land contained in the aerial data. In some embodiments, the coordinate information of the at least one piece of the sample aerial data further includes one or more of longitude, latitude, altitude, and time.

In some embodiments, the database includes a sample pool storing the sample aerial data not being annotated and an annotation pool storing the annotated aerial data. In some embodiments, the sample aerial data with few annotation times, high first uncertainty degree, or high second uncertainty degree has a high priority in the ordering rule.

In some embodiments, the model library obtains the annotated aerial data from the database and generates the crop classification model based on a data training model analyzing the annotated aerial data. In some embodiments, the data training model includes a discrete data prediction model or a sequential data prediction model.

In some embodiments, the data training model further includes a parcel identification model. In some embodiments, each piece of sample aerial data displayed on the user terminal includes a center parcel. A crop classification of an area represented by the center parcel is associated with the sample aerial data at the user terminal, and the associated sample aerial data is stored to the database as the annotated aerial data.

According to another aspect of the present disclosure, a method for identifying a type of a crop in an aerial data is disclosed. The sample aerial data are obtained. The sample aerial data are stored in a database. The sample aerial data are provided for annotation according to an ordering rule. A type of a crop appearing in the sample aerial data is determined to obtain annotated aerial data. The annotated aerial data are returned to the database. A crop classification model is trained based on at least the annotated aerial data. The trained crop classification model is applied to subsequent crop identification.

In some embodiments, a discrete data prediction model or a sequential data prediction model is provided to generate the crop classification model. In some embodiments, the annotated aerial data are provided to a user terminal to re-annotate the annotated aerial data, and the re-annotated aerial data are stored to the database.

In some embodiments, the sample aerial data are displayed on the user terminal, and each piece of the sample aerial data has a center parcel. A crop classification of an area represented by the center parcel is associate with the sample aerial data to generate the annotated aerial data. In some embodiments, a plurality of sample aerial data representing a same area at different times are provided.

In some embodiments, at least one piece of the sample aerial data includes coordinate information indicative of the geodetic location of a parcel of land contained in the aerial data. In some embodiments, the coordinate information of the at least one piece of sample aerial data further includes one or more of longitude, latitude, altitude, and time. In some embodiments, the ordering rule is defined based on a number indicative of annotation times of each piece of sample aerial data, a first value indicative of a first uncertainty degree of each piece of sample aerial data, and a second value indicative of a second uncertainty degree of the crop classification model. In some embodiments, the sample aerial data with few annotation times, high first uncertainty degree, or high second uncertainty degree has a high priority in the ordering rule.

In some embodiments, the database includes a sample pool storing the sample aerial data not being annotated and an annotation pool storing the annotated aerial data. In some embodiments, at least the annotated aerial data are provided to a model library to generate the crop classification model, the crop classification model is returned to the database, and the ordering rule is updated based on the crop classification model.

According to another aspect of the present disclosure, a tangible computer-readable device has instructions stored thereon that, when executed by at least one computing device, causes the at least one computing device to perform the following operations. The sample aerial data are obtained. The sample aerial data are stored in a database. The sample aerial data are provided for annotation according to an ordering rule. A type of a crop appearing in the sample aerial data is determined to obtain annotated aerial data. The annotated aerial data are returned to the database. A crop classification model is trained based on at least the annotated aerial data. The trained crop classification model is applied to subsequent crop identification. [75] The foregoing description of the specific implementations can be readily modified and/or adapted for various applications. Therefore, such adaptations and modifications are intended to be within the meaning and range of equivalents of the disclosed implementations, based on the teaching and guidance presented herein. The breadth and scope of the present disclosure should not be limited by any of the above-described exemplary implementations, but should be defined only in accordance with the following claims and their equivalents.

What is claimed is:

1. An image-based crop identification system, comprising:
   a database storing sample aerial data and annotated aerial data;
   a communication module coupled to the database, the communication module configured to provide the sample aerial data to a user based on an ordering rule and receive the annotated aerial data from the user, wherein the ordering rule is determined based at least in part on a number indicative of annotation times of each piece of sample aerial data; and
   a model library coupled to the database, the model library configured to obtain the annotated aerial data, train a crop classification model based on the annotated aerial data, and provide the trained crop classification model for subsequent crop identification,
   wherein the annotated aerial data comprise determination of a type of a crop appearing in the sample aerial data.

2. The image-based crop identification system of claim 1, further comprising:
   a user terminal coupled to the communication module, the user terminal further comprising a display and an input interface,
   wherein the display shows the sample aerial data to the user and the input interface receives one or more annotation instructions from the user.

3. The image-based crop identification system of claim 1, wherein the ordering rule is determined further based on a first value indicative of a first uncertainty degree of each piece of sample aerial data and a second value indicative of a second uncertainty degree of the crop classification model.

4. The image-based crop identification system of claim 1, wherein the communication module receives a plurality of sample aerial data representing a same area at different times, and
   wherein the plurality of sample aerial data are annotated with a crop classification to determine the type of the crop appearing in the sample aerial data at each time.

5. The image-based crop identification system of claim 1, wherein at least one piece of sample aerial data comprises coordinate information indicative of a geodetic location of a parcel of land contained in the sample aerial data.

6. The image-based crop identification system of claim 5, wherein the coordinate information of the at least one piece of sample aerial data further comprises one or more of longitude, latitude, altitude, and time.

7. The image-based crop identification system of claim 1, wherein the database comprises a sample pool storing the sample aerial data not being annotated and an annotation pool storing the annotated aerial data.

8. The image-based crop identification system of claim 1, wherein the model library obtains the annotated aerial data from the database and generates the crop classification model based on a data training model analyzing the annotated aerial data.

9. The image-based crop identification system of claim 8, wherein the data training model further comprises a parcel identification model.

10. The image-based crop identification system of claim 9, wherein each piece of sample aerial data displayed on a user terminal comprises a center parcel,
    wherein a crop classification of an area represented by the center parcel is associated with the sample aerial data at the user terminal, and
    wherein the associated sample aerial data is stored to the database as the annotated aerial data.

11. A method for identifying a type of a crop in aerial data, comprising:
    obtaining sample aerial data;
    storing the sample aerial data in a database;
    providing the sample aerial data for annotation according to an ordering rule, wherein the ordering rule is determined based at least in part on a number indicative of annotation times of each piece of sample aerial data;
    determining the type of the crop appearing in the sample aerial data to obtain annotated aerial data;
    returning the annotated aerial data to the database;
    training a crop classification model based on at least the annotated aerial data; and
    applying the trained crop classification model to subsequent crop identification.

12. The method of claim 11, wherein training the crop classification model comprises:
    providing a discrete data prediction model or a sequential data prediction model to generate the crop classification model.

13. The method of claim 11, further comprising:
    providing the annotated aerial data to a user terminal to re-annotate the annotated aerial data, and
    storing the re-annotated aerial data to the database.

14. The method of claim 11, wherein determining the type of the crop appearing in the sample aerial data comprises:
    displaying the sample aerial data on a user terminal, each piece of the sample aerial data having a center parcel; and
    associating a crop classification of an area represented by the center parcel with the sample aerial data to generate the annotated aerial data.

15. The method of claim 11, wherein at least one piece of sample aerial data comprises coordinate information indicative of a geodetic location of a parcel of land contained in the sample aerial data.

16. The method of claim 15, wherein the coordinate information of the at least one piece of sample aerial data further comprises one or more of longitude, latitude, altitude, and time.

17. The method of claim 11, wherein the ordering rule is determined further based on a first value indicative of a first uncertainty degree of each piece of sample aerial data and a second value indicative of a second uncertainty degree of the crop classification model.

18. The method of claim 11, wherein the database comprises a sample pool storing the sample aerial data not being annotated and an annotation pool storing the annotated aerial data.

19. The method of claim 11, wherein training the crop classification model based on at least the annotated aerial data further comprises:
   providing at least the annotated aerial data to a model library to generate the crop classification model;
   returning the crop classification model to the database; and
   updating the ordering rule based on the crop classification model.

20. A non-transitory computer-readable medium having instructions stored thereon that, when executed by at least one processor, causes the at least one processor to perform a method for identifying a type of a crop in aerial data, comprising:
   obtaining sample aerial data;
   storing the sample aerial data in a database;
   providing the sample aerial data for annotation according to an ordering rule, wherein the ordering rule is determined based at least in part on a number indicative of annotation times of each piece of sample aerial data;
   determining the type of the crop appearing in the sample aerial data to obtain annotated aerial data;
   returning the annotated aerial data to the database;
   training a crop classification model based on at least the annotated aerial data; and
   applying the trained crop classification model to subsequent crop identification.

* * * * *